United States Patent
Kyrtsos

[11] Patent Number: 5,909,171
[45] Date of Patent: Jun. 1, 1999

[54] TEMPERATURE SENSING BRAKE LINING WEAR INDICATOR

[75] Inventor: Christos T. Kyrtsos, Southfield, Mich.

[73] Assignee: Meritor Heavy Vehicle Systems, L L C, Troy, Mich.

[21] Appl. No.: 09/071,177

[22] Filed: May 1, 1998

Related U.S. Application Data

[63] Continuation-in-part of application No. 08/895,979, Jul. 17, 1997.

[51] Int. Cl.$^6$ .............................. B60Q 1/00; F16D 66/00
[52] U.S. Cl. .................. 340/454; 340/588; 188/1.11 W; 188/1.11 R; 116/208; 374/7
[58] Field of Search ..................................... 340/454, 453, 340/588, 589; 188/1.11 R, 1.11 W, 1.11 L, 1.11 E; 116/208; 73/121; 374/7, 10

[56] References Cited

U.S. PATENT DOCUMENTS

| | | | |
|---|---|---|---|
| 1,957,051 | 5/1934 | Norton | 73/32 |
| 2,494,269 | 1/1950 | Sparkes | 177/311 |
| 3,674,114 | 7/1972 | Howard | 188/1 A |
| 3,825,891 | 7/1974 | Kinast | 340/52 |
| 3,975,706 | 8/1976 | Kato | 340/52 A |
| 4,020,454 | 4/1977 | Malonee | 340/52 B |
| 4,204,190 | 5/1980 | Wiley | 340/52 A |
| 4,520,661 | 6/1985 | Tamai et al. | 73/129 |
| 4,646,001 | 2/1987 | Baldwin et al. | 324/65 |
| 4,649,370 | 3/1987 | Thomason | 340/52 B |
| 4,658,936 | 4/1987 | Moseley | 188/1.11 |
| 4,674,326 | 6/1987 | Reinecke | 188/1.11 |
| 4,790,606 | 12/1988 | Reinecke | 303/103 |
| 4,824,260 | 4/1989 | Novotny et al. | 188/1.11 |
| 4,964,679 | 10/1990 | Rath | 303/100 |
| 4,971,179 | 11/1990 | Gebhardt | 188/33 |
| 5,079,947 | 1/1992 | Feldmann et al. | 340/453 |
| 5,372,221 | 12/1994 | Jalbert | 188/1.11 |
| 5,419,415 | 5/1995 | Lamb | 188/1.11 |
| 5,550,743 | 8/1996 | Kyrtsos | 364/449 |
| 5,559,286 | 9/1996 | White | 73/129 |
| 5,637,794 | 6/1997 | Hanisko | 188/1.11 |
| 5,651,431 | 7/1997 | Kyrtsos | 188/1.11 |
| 5,668,529 | 9/1997 | Kyrtsos | 340/454 |

FOREIGN PATENT DOCUMENTS

| | | |
|---|---|---|
| 0337919 | 10/1989 | European Pat. Off. . |
| 2319880 | 2/1977 | France . |
| 4108622 | 9/1992 | Germany . |

*Primary Examiner*—Donnie L. Crosland

[57] ABSTRACT

A brake lining wear indicator utilizes a temperature sensor assembly embedded in a brake lining of a drum brake assembly. The temperature sensor assembly includes two temperature sensors with a first temperature sensor located at a first distance X from the wear surface of the brake lining and a second temperature sensor located at a second distance X+d from the wear surface. A timing device measures the time period for the first temperature sensor to reach a first predetermined temperature and measures the time period for the second temperature sensor to reach a second predetermined temperature. The remaining useful thickness of the brake lining is determined based on the ratio of the respective time periods. Thus, the indicator provides a time-temperature based determination of when the brake linings should be replaced. This determination is easily monitored during the operation of the vehicle and can be made without requiring a physical measurement or visual inspection of the thickness of the brake lining on each brake shoe.

18 Claims, 3 Drawing Sheets

TEMPERATURE SENSING BRAKE LINING WEAR INDICATOR

BACKGROUND OF THE INVENTION

This application is a continuation-in-part of a copending application, Ser. No. 08/895,979 filed on Jul. 17, 1997. This invention relates to a unique brake lining wear indicator utilizing a temperature sensor assembly embedded in a brake lining of a drum brake assembly.

Drum brakes are widely used in vehicle braking systems. In a typical drum brake, two arcuate brake shoe assemblies are located inside a rotating cylindrical brake drum. Each brake shoe assembly includes a backing plate which carries brake lining friction material presenting a wear surface. A brake actuator moves the brake shoe assemblies toward the rotating brake drum such that the wear surface of the brake lining friction material contacts the inner surface of the drum, thus retarding the rotation of the drum. Over a period of time, the contact between the lining and the drum causes the lining to wear. If the lining becomes too thin, ineffective braking can occur. Thus, it is desirable to provide an indication when brake lining thickness is such that the brake shoes should be changed.

Several problems arise when trying to determine whether the brake linings have sufficiently worn such that they need to be changed. Often the wheel and the brake drum have to be removed from the vehicle for the brake lining thickness to be measured. This is cumbersome and time consuming. Visual brake lining wear indicators, such as notches in the lining or color coded layers in the lining, have been used more effectively to determine when the linings should be changed. When a visual wear indicator is used, an inspector can visually examine each brake lining to determine whether it needs to be changed without having to physically measure the thickness. However, the use of these visual wear indicators can also be cumbersome and time consuming because they require the inspector to visually check each lining while the vehicle is stationary. Thus, it is desirable to have an efficient way to continuously monitor the brake lining thickness during the operation of the vehicle to determine whether the brake linings need to be replaced without having to visually inspect each brake lining.

Some prior art systems have monitored brake lining thickness on vehicles by using a single thermistor sensor in the lining which changes its electrical resistance based on temperature. Brake lining wear for this system is calculated based on changes in measured resistance of the thermistor. Such systems can often be ineffective and produce inaccurate results. Other systems have monitored the temperature of the brake linings to compare these temperatures to electronically stored standard characteristics for the brake lining. These systems are complicated and vary from lining to lining due to varying characteristics in lining materials and configurations.

Thus, it is desirable to have a simple temperature based lining wear indicator which can be used universally on all brake linings and which calculates accurate remaining useful thicknesses of brake lining material.

SUMMARY OF THE INVENTION

The subject invention overcomes the deficiencies of prior art methods by using two sensors embedded in the brake lining near the interface between the brake lining and the backing plate. Each sensor is located at a different distance from the wear surface of the brake lining and measures the temperature of the brake lining at its respective location in the lining. Each sensor is also located a pre-determined distance apart from the other. The time it takes for each sensor to reach a respective predetermined temperature, a pre-determined temperature change, or a percentage change in temperature is measured and the amount of wear for the brake lining is monitored based on a relationship between these two times. When the two sensors are located at a first pre-determined distance from each other, a first relationship exists between the two times. However, when the two sensors are located close together, i.e. at a second pre-determined distance which is less than the first pre-determined distance, a second relationship exists between the two times.

The invention includes a method for indicating the remaining amount of brake lining material in a drum brake assembly which utilizes a brake actuator, a cylindrical drum, and at least one brake shoe assembly having a brake lining supported by a backing plate. The brake lining has a temperature assembly comprised of first and second temperature sensors. The method for indicating the thickness of the brake lining on the backing plate comprises the following steps: actuating the brake shoe assembly against the drum, producing a first time signal $T_1$ in response to timing the period for a temperature sensor to reach a first predetermined temperature, producing a second time signal $T_2$ in response to timing the period for a second temperature sensor to reach a second predetermined temperature, determining an amount of remaining brake lining material based on the first $T_1$ and second $T_2$ time signals, and displaying the amount of remaining brake lining.

The apparatus of the invention includes a cylindrical drum with an inner and outer surface, at least one arcuate brake shoe assembly having a brake lining supported by a backing plate and presenting a wear surface opposite from the inner surface of the drum, and an actuator for actuating the wear surface against the inner surface of the drum. The apparatus also includes a first sensor for measuring a first brake lining temperature, a second sensor for measuring a second brake lining temperature, and a timing device for producing a first time signal $T_1$ in response to timing the period for said first brake lining temperature to reach a first predetermined temperature, and for producing a second time signal $T_2$ in response to timing the period for said second brake lining temperature to reach a second predetermined temperature. A processor determines an amount of remaining brake lining material based on the first $T_1$ and second $T_2$ time signals and a display shows the amount of remaining brake lining material.

The subject invention offers several advantages over prior art systems because it provides a simple, effective, and accurate method and apparatus for monitoring the thickness of brake linings without ever having to remove wheel end equipment and either visually inspect or physically measure the brake linings.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
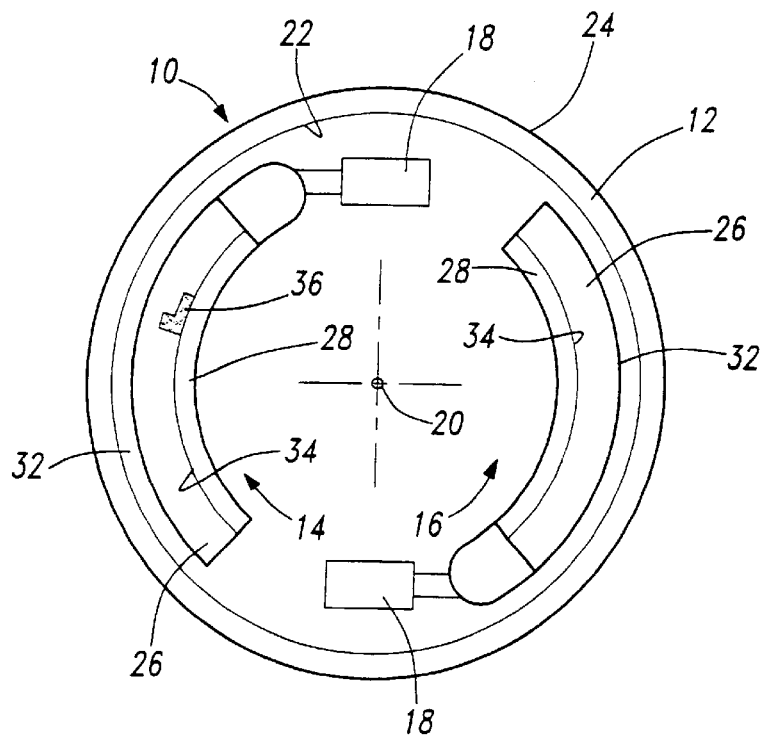
FIG. 1 is a side view of a drum brake utilizing the subject invention.

As shown in FIG. 1, a drum brake system 10 includes a cylindrical brake drum 12, a first brake shoe assembly generally shown at 14, a second brake shoe assembly generally shown at 16, and an actuator 18. The general operation of the drum brake system is known. The first 14 and second 16 brake shoe assemblies are preferably identical such that any description of the first brake shoe assembly 14 or its components is also applicable to the second brake shoe assembly 16. Drum brake system 10 can be of various types of systems such as a cam brake, a wedge brake, or a drum brake actuated by a hydraulic cylinder. Actuator 18, shown schematically, represents any known actuating mechanism for drum brake systems such as an cam mechanism, a wedge mechanism, or a hydraulic cylinder. The actuator 18 moves the brake shoe assemblies 14, 16 into contact with the rotating brake drum 12 and can be controlled hydraulically or pneumatically.

The brake drum 12, which rotates about an axis of rotation 20, has an inner surface 22 and an outer surface 24. The brake shoe assemblies 14, 16, located adjacent to the inner surface 22 of the brake drum 12, include a brake lining 26 comprised of a known friction material attached to a backing plate 28. Each brake lining 26 presents a wear surface 32 which contacts the inner surface 22 of the rotating brake drum 12 each time the actuator 18 moves the brake shoe assemblies 14, 16 against the drum 12. Each brake lining 26 also includes an interface surface 34 which contacts the backing plate 28.

A brake lining temperature sensor assembly 36 is located on the first brake shoe assembly 14. This temperature sensor assembly 36 can be located on either or both brake shoe assemblies 14, 16 but typically need only be on the leading brake shoe assembly which experiences the most wear.

Figure 2:
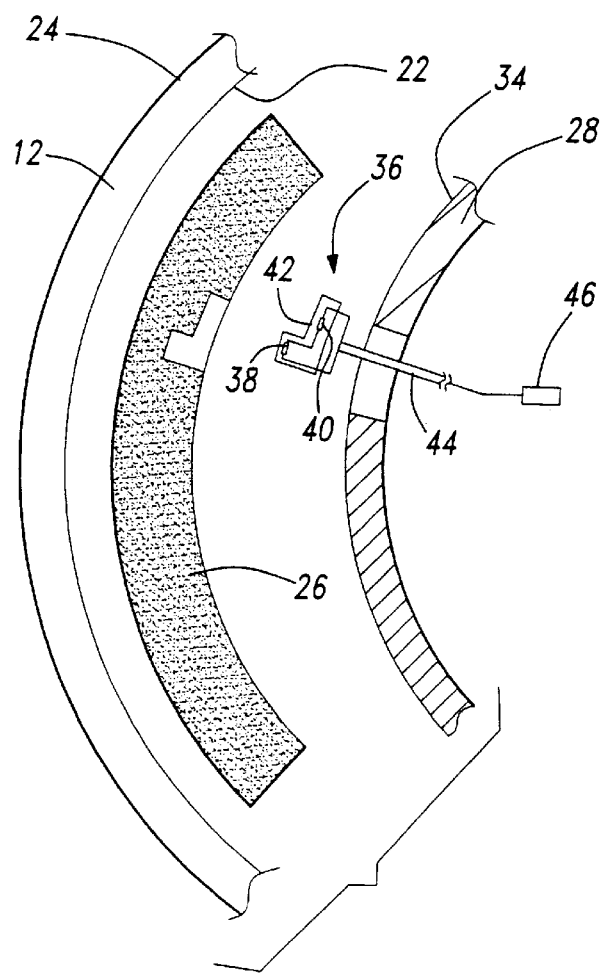
FIG. 2 is a is a partial exploded view of a drum brake system utilizing the subject invention.

As shown in FIG. 2, the temperature sensor assembly 36 includes first 38 and second 40 sensors which measure first and second brake lining temperatures respectively. A housing 42, supported by the backing plate 28, substantially surrounds the first 38 and second 40 sensors. In the preferred embodiment, the housing 42 is fixed to the backing plate 28 such that the first 38 and second 40 sensors are located close to the interface 34 between the brake lining 26 and the backing plate 28.

Each sensor 38, 40 is located at a different distance from the wear surface 32 of the brake lining 26 and measures the temperature of the brake lining 26 at its respective location in the lining 26. Each sensor 38, 40 is also located a pre-determined distance "d" apart from the other. The time it takes for each sensor 38, 40 to reach a respective predetermined temperature is measured and the amount of wear for the brake lining 26 is monitored based on a relationship between these two times. It should be noted that the reference to a predetermined temperature encompasses reference to a specific pre-determined temperature, a specific temperature change, or a specific percentage change in temperature. When the two sensors 38, 40 are located at a first predetermined distance $d_1$ from each other, a first relationship exists between the two times. However, when the two sensors 38, 40 are located close together, i.e. at a second pre-determined distance $d_2$ which is less than the first predetermined distance $d_1$, a second relationship exists between the two times. This will be discussed in greater detail below.

The housing 42 is preferably embedded in the brake lining 26 which is molded to accommodate the temperature sensor assembly 36. Once the temperature sensor assembly 36 has been inserted into the brake lining 26, brake lining 26, temperature sensor assembly 36 and backing plate 28 are pressed together so the temperature sensor assembly 36 is firmly held in place. Alternatively, the sensor assembly 36 could be mounted directly onto the backing plate 28 and the lining 26 could then be placed over the sensor assembly 36. The brake linings 26 can be attached to the backing plates 28, 30 in various ways that are known in the art.

At least one electrical lead 44 extends from the temperature sensor assembly 36 either through the backing plate 28 or along the interface 34 between the backing plate 28 and the brake lining 26. Lead 44 transmits data to an electronic control unit (ECU) 46 which will be explained in greater detail below.

Figure 3:
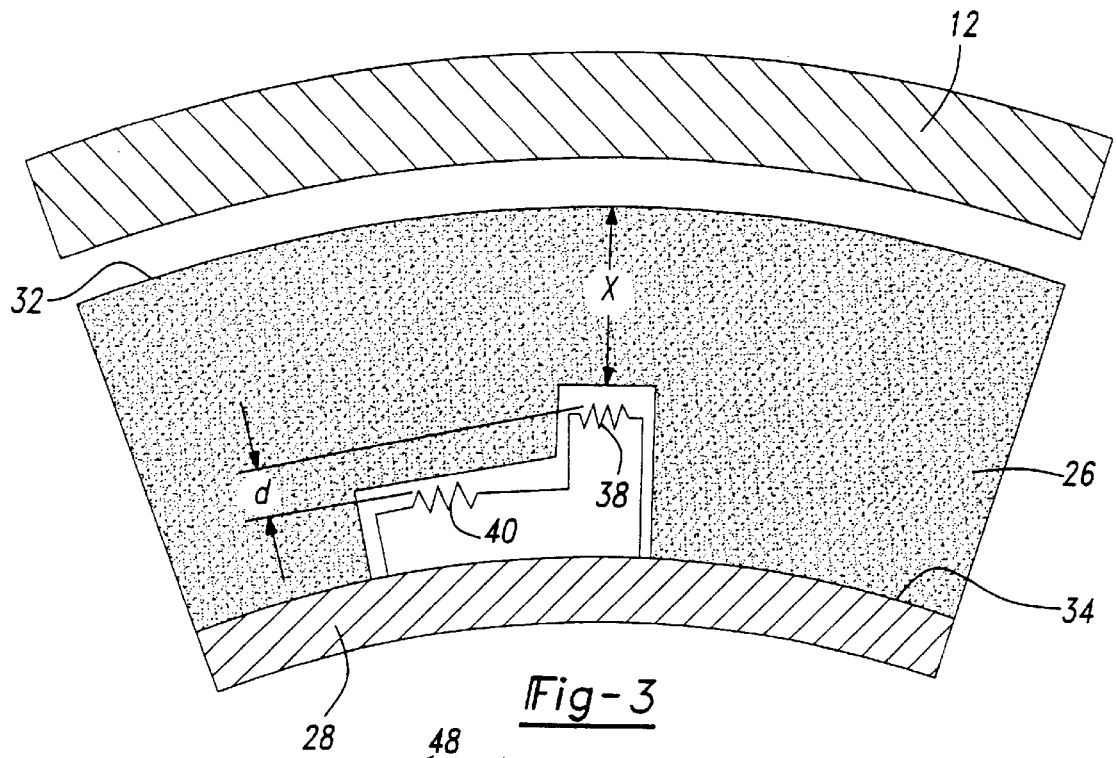
FIG. 3 is a magnified view of the brake shoe assembly.

As shown in FIG. 3, the first temperature sensor 38 is located at a distance X from the wear surface 32 of the brake lining 26. The distance X is related to the remaining useful thickness of the brake lining 26 on the backing plate 28. The second temperature sensor 40 is located at a distance X+d from the wear surface 32 of the brake lining 26. The distance "d" is a known constant, either pre-determined or determined by calibration after installation, representing the fixed distance between the first 38 and second 40 sensors. It is important to note that the distance X varies during the operation of the vehicle. The brake lining 26 will wear slightly after each brake application so that the distance X will continually decrease in thickness over time until it reaches a point at which the brake shoe assemblies 14, 16 should be changed out.

Figure 4A:
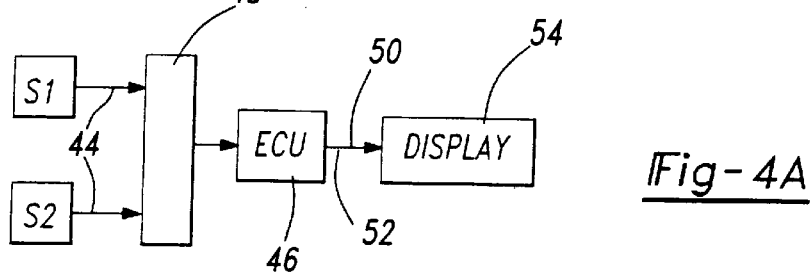
FIG. 4A is a schematic view of the subject invention.

As previously mentioned, the first sensor 38 measures a first brake lining temperature and the second sensor 40 measures a second brake lining temperature. Associated with each sensor 38, 40 is a timing device 48, shown schematically in FIG. 4A, for measuring the time period for each sensor 38, 40 to reach a predetermined temperature. The data from the first 38 and second 40 sensors is transmitted to the timing device 48 via the electrical lead 44. The data could also be transmitted by other means well known in the art, such as by RF means, for example. The timing device 48 can be of any such device known in the art, and could also be the ECU 46 itself.

Upon actuation of the brake, the timing device 48 produces a first time signal $T_1$ in response to timing the period for the first sensor 38 to reach a first predetermined temperature and produces a second time signal $T_2$ in response to timing the period for the second sensor 40 to reach a second predetermined temperature. Preferably, the second time signal $T_2$ represents the time period between the first sensor 38 reaching the first predetermined temperature and the second sensor 40 reaching the second predetermined temperature. Alternatively, the second time signal $T_2$ could represent the time period it takes for the first sensor 38 to reach the first pre-determined temperature plus the additional time it take for the second sensor 40 to reach the second pre-determined temperature with the relationship between the first $T_1$ and second $T_2$ time signals adjusted accordingly. The first $T_1$, and second $T_2$ time signals are transmitted to the electronic control unit (ECU) or central processor 46 which calculates the first distance X based on the distance "d" and the ratio of the first time signal $T_1$ to the second time signal $T_2$. The distance "d" should be understood to refer generally to the distance between the sensors 38 and 40, the different relationships that exist between the first $T_1$ and second $T_2$ time signals as a result of changing the distance "d" are discussed in detail below.

Figure 4B:
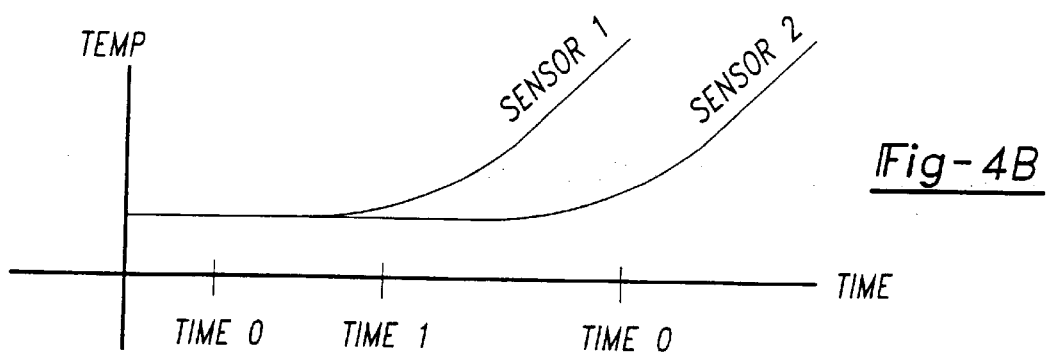
FIG. 4B is a graph of the temperature versus time for the subject invention.

As exemplified in the simple temperature versus time graph in FIG. 4B, $TIME_0$ represents an initial time just before the brake shoe assembly 14 is first applied and where the temperature of the brake lining 26 is at its initial temperature. Once the brake is applied, the temperature in the brake lining 26 starts to increase. The time it takes for the temperature to travel the distance X to reach the first sensor 38 and to attain the first predetermined temperature is represented by $TIME_1$. The time it takes for the temperature to travel the additional distance "d" to reach the second sensor 40 to attain the second predetermined temperature is represented by $TIME_2$. Thus, the first time signal $T_1$ is equal to $TIME_1$ minus $TIME_0$ and the second time signal $T_2$ is equal to $TIME_2$ minus $TIME_1$.

The first and second predetermined temperatures can be set at any degree above zero (0) degrees Celsius or the equivalent thereof. Also, the first and second predetermined temperatures can be the same temperature, as shown in FIG. 4B, or they can be different temperatures.

Figure 4C:
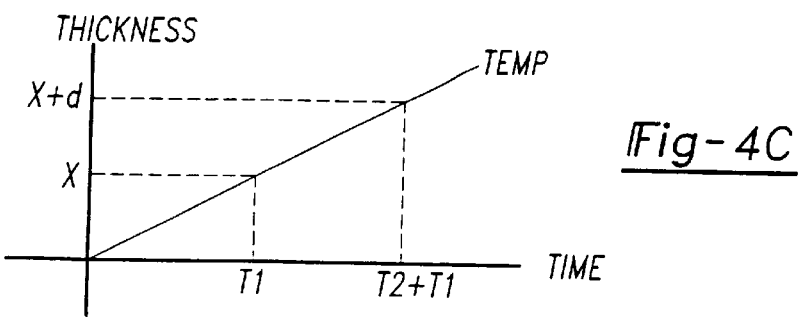
FIG. 4C is a graph of the lining thickness versus time for the subject invention.

As exemplified in the simple lining thickness versus time graph in FIG. 4C, the first time signal $T_1$ is related to the time for the first predetermined temperature to travel the distance X and the second time signal $T_2+T_1$ is related to the time for the second predetermined temperature to travel the distance X+d. The increasing temperature in FIG. 4C is shown linearly. In practice the temperature may increase in a non-linear manner.

The significant feature to be taken from both of these graphs is that each sensor 38, 40 has a respective time period to reach its predetermined temperature. When the brake linings 26 are new, the first time signal $T_1$ will be longer then when the brake linings 26 are significantly worn. Thus, as the remaining useful thickness X of the brake lining 26 decreases, the first time signal $T_1$ will also be decreasing.

Figure 5A:
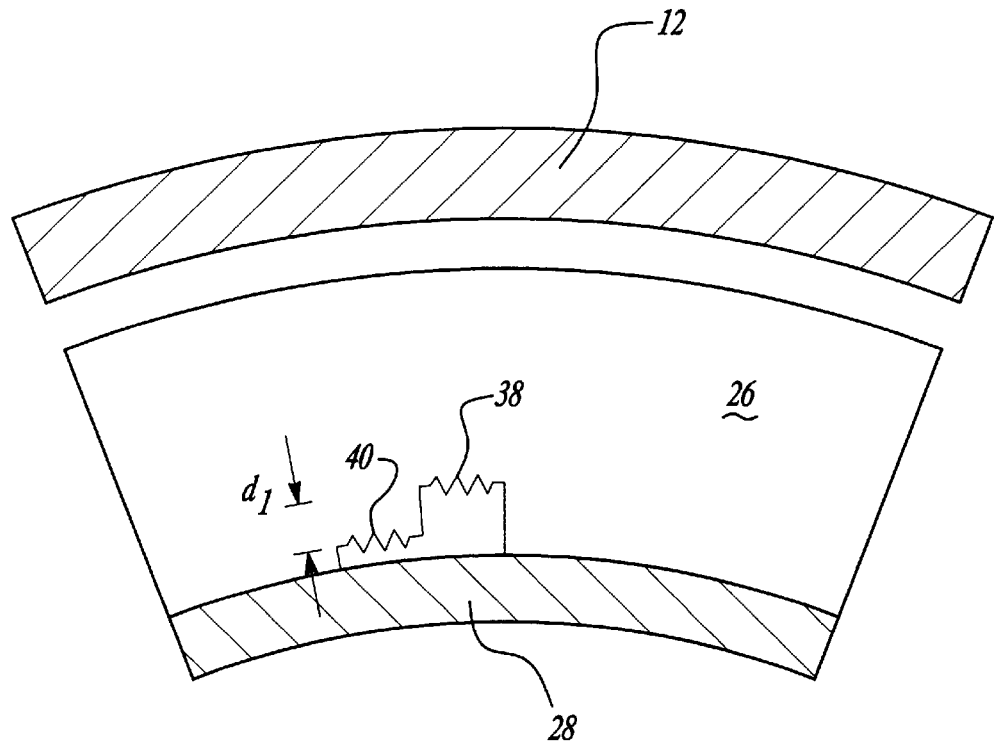
FIG. 5A shows a first embodiment of the sensor assembly.
Figure 5B:
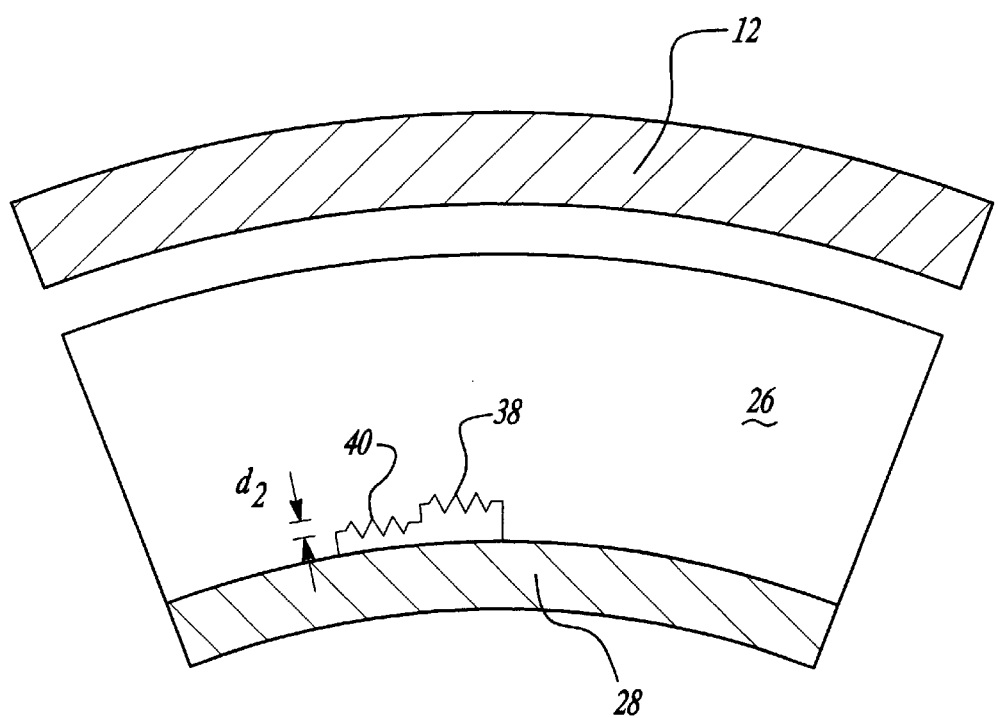
FIG. 5B shows a second embodiment of the sensor assembly.

FIGS. 5A and 5B show two different embodiments for the sensor assembly 36. FIG. 5A shows the general embodiment where the first sensor 38 is spaced apart from the second sensor 40 by a distance $d_1$. The distance $d_1$ will remain a constant until the brake lining 26 has sufficiently worn such that the first sensor 38 is exposed. Once the brake lining 26 has worn through the first sensor 38, the distance $d_1$ will start to decrease as more brake applications are made, thus, varying the second time signal $T_2$.

Once the central processor 46 receives the first $T_1$ and second $T_2$ time signals it calculates the remaining useful thickness X of the brake lining 26 based on the following formula $$X = \frac{(d_1)(T_1^{3/4})}{((T_2 + T_1)^{3/4} - T_1^{3/4})}$$

where $T_1$ is the first time signal, $T_2$ is the second time signal, and $d_1$ is a known constant representing the distance between the first 38 and second 40 sensors. This formula can be used to determine the remaining useful thickness X of the brake lining 26 regardless of what the distance $d_1$ is between the first 38 and second 40 sensors. This relationship is derived from the following general formula $$U(x,t) = t_0[2(K_2 t/\pi)^{1/2}(e^{-(x)(x)/(4K_1 t)}) - x erfc(x/(2(K_1 t)^{1/2}))]$$

where $U(x,t)$ is the temperature variation from steady state, $t_0$ is the initial boundary temperature interface between the drum 12 and the lining 26, $k_1$ is the thermal diffusivity, x is the distance into the brake lining, and t is the time that passes from when the brake is applied. The thermal diffusivity $k_1$ is equal to the thermal conductivity divided by the density and specific heat capacity for the particular lining 26 in use. A typical value for "t" is greater than four seconds and the initial boundary temperature interface $t_0$ is typically greater than one hundred degrees Celsius.

FIG. 5B shows an alternate embodiment where the first 38 and second 40 sensors are located close together. This embodiment defines a distance $d_2$ which is less than $d_1$. In this configuration, discussed in detail in co-pending application Ser. No. 08/895,979, a simplified relationship exists between the first $T_1$ and second $T_2$ time signals. When this embodiment is used, the remaining useful thickness X of the brake lining 26 is based on the following formula $$X = \frac{(d_2)(T_1)}{(T_2)}$$

where $T_1$ is the first time signal, $T_2$ is the second time signal, $d_2$ is a known constant representing the distance between the first 38 and second 40 sensors which is less than $d_1$, and the first distance X is the remaining useful thickness of the brake lining 26 on the backing plate 28. It should be noted that this relationship between the first $T_1$ and second $T_2$ time signals only applies when the first 38 and second 40 sensors are located close together. Thus, this simplified formula is for the more specific case where the first 38 and second 40 sensors are less than a pre-determined distance $d_1$ apart from each other, i.e. the sensors 38, 40 are very close to one another.

The first 38 and second 40 sensors are preferably connected in series and can be of any various forms of temperature sensors known in the art including, but not limited to, sensors such as thermocouples or thermistors. Also, while the sensors 38, 40 are preferable connected in series to minimize the number of leads, they could be connected in other configurations. In the preferred embodiment the first temperature sensor 38 is a negative temperature coefficient (NTC) thermistor and the second temperature sensor 40 is a positive temperature coefficient (PTC) thermistor. The NTC thermistor is a resistive circuit component, having a high negative temperature coefficient of resistance, so that its resistance decreases as the temperature increases. The resistance of the PTC thermistor increases as the temperature increases. Thus, as the temperature rises due to an application of the brake shoe assembly 14 against the drum 12, the resistance of the first sensor 38 decreases corresponding to an increase in current. When the second sensor 40 senses an increase in temperature, resistance increases corresponding to a current decrease which first plateaus and then returns or cancels out the initial increase in current due to the change in resistance of the first sensor 38. While the preferred embodiment discloses the first sensor 38 as a NTC thermistor and the second sensor 40 as a PTC thermistor, it is understood that the first 38 and second 40 sensors could be either PTC or NTC thermistors.

To summarize, the method for indicating the amount of brake lining material 26 in a drum brake assembly 10 includes the following steps: actuating the brake shoe assembly 14 against the drum 12, producing the first time signal $T_1$ in response to timing the period for the first sensor to reach a predetermined temperature, producing the second time signal $T_2$ in response to timing the period for the second sensor to reach a predetermined temperature, determining an amount of remaining brake lining material based on the first $T_1$ and second $T_2$ time signals, and displaying the amount of remaining brake lining. More specifically, producing the first $T_1$ and second $T_2$ time signals is further defined as timing the period for the first predetermined temperature to travel a first distance X into the brake lining 26 from its wear surface 32 and timing the period for the second predetermined temperature to travel the second distance X+d into the brake lining 26 from its wear surface 32. The first distance X, related to the remaining useful thickness of the brake lining on the backing plate, is calculated based on the ratio of the first $T_1$ and second $T_2$ time signals. A warning device can be activated when the ratio of the time signals exceeds a predetermined limit. The remaining useful thickness of the brake lining, X, could also be displayed to the driver so that the driver could continuously monitor the lining wear.

In its simplest form the method could simply utilize the ratio of $T_1$ and $T_2$ which is compared to a representative ratio indicative of a worn lining. That is, no distance X need be calculated. Instead, the warning device can be activated simply when the ratio of $T_1$ to $T_2$ exceeds a predetermined ratio indicative of a worn lining.

When the distance X is reduced to a first predetermined amount or the ratio exceeds its predetermined limit, a warning signal 50 is produced indicating the drum brake assembly 10 has reached a first change level so that the operator (not shown) knows that the brake shoe assemblies 14, 16 need to be changed. This predetermined amount may correspond to a point in the lining 26 near the first sensor 38. Thus, the first warning signal 50 should be produced just before the first sensor 38 is "exposed." However, the system will continue to operate once the first sensor 38 is exposed. As the first sensor 38 is worn away during subsequent brake applications, the first sensor 38 becomes inoperable and $T_1$ is effectively zero (0). The second sensor 40 is still operable and the second time signal $T_2$ will continue to be produce however, the calculated remaining thickness X will be zero (0) due to $T_1$ being zero (0). Once the brake lining 26 has worn down such that the second sensor 40 is close to being exposed, a second warning signal 52 will be produced which will indicate that a second change level has arisen and that the brake shoes 14, 16 should be changed out soon. The warning signals 50, 52 will activate some form of a warning device 54 well known in the art such as a light or digital display. The warning signals can be audible, such as a beeping noise, or can be visual, such as a blinking light, or can be a combination of both.

Also, once the first sensor 38 becomes inoperable, levels of warning could be established just from temperature data from the second sensor 40. The temperature rise of the second sensor 40 could be monitored such that certain predetermined temperatures would signal that the lining has worn significantly and should be changed. In this situation, the second time signal $T_2$ will eventually decrease non-linearly to zero (0).

This method can be used to determine the remaining useful thickness X of the brake lining 26 for a single braking application or a mean remaining useful thickness X could be calculated based on a predetermined number of braking applications forming a sample set. That is, X may be recalculated based upon a plurality of averaged durations. Using a sample set based determination would avoid inaccuracies based on brake variability for a single brake application. Because brake linings 26 do not change dramatically after every brake application, computation of a mean remaining useful thickness X for a given sample set would, on the average, produce an accurate result.

Although this invention is disclosed in a drum brake assembly, the main inventive concepts have application and provide benefits in other type brakes that have linings which wear.

A preferred embodiment of this invention has been disclosed, however, a worker of ordinary skill in the art would recognize that certain modifications come within the scope of this invention. For that reason, the following claims should be studied to determine the true scope and content of this invention.

We claim:

1. A method for indicating the remaining amount of brake lining material in a drum brake assembly comprising the steps of:
   1) providing a brake actuator, a cylindrical drum, and at least one brake shoe assembly having a brake lining supported by a backing plate, the lining including a temperature assembly comprised of at least two temperature sensors;
   2) actuating the brake shoe assembly against the drum;
   3) producing a first time signal $T_1$ in response to timing the period for a first temperature sensor to reach a first predetermined temperature;
   4) producing a second time signal $T_2$ in response to timing the period for a second temperature sensor to reach a second predetermined temperature;
   5) determining an amount of remaining brake lining material based on a comparison between the first $T_1$ and second $T_2$ time signals; and
   6) displaying the amount of remaining brake lining.

2. A method as set forth in claim 1 further including the step of placing the first sensor at a pre-determined distance apart from the second sensor.

3. A method as set forth in claim 2 wherein producing the first $T_1$ and second $T_2$ time signals is further defined as timing the period for the first predetermined temperature to travel a first distance into the brake lining from a wear surface and timing the period for the second predetermined temperature to travel a second distance into the brake lining from the wear surface, said second distance being greater than said first distance.

4. A method as set forth in claim 3 further including the step of calculating the first distance according to the following formula $$X = \frac{(d_1)(T_1^{3/4})}{((T_2 + T_1)^{3/4} - T_1^{3/4})}$$

wherein $T_1$ is the first time signal, $T_2$ is the second time signal, $d_1$ is a known constant representing the predetermined distance between the first and second sensors, and X is the first distance representing the remaining useful thickness of the brake lining on the backing plate.

5. A method as set forth in claim 4 further including the step of producing a warning signal when the first distance X is reduced to a first predetermined amount, indicating the brake lining has reached a first change level.

6. A method as set forth in claim 1 further including the steps of producing first and second time signals for a selected number of brake actuations respectively, calculating average first and second time signals for the total number of brake actuations selected, computing a mean average distance X related to the brake lining thickness, and producing a warning signal when the mean first distance X has been reduced to a predetermined amount.

7. A method as set forth in claim 2 further including the step of placing the first sensor at an alternate distance apart from the second sensor wherein said alternate distance is less than said pre-determined distance.

8. A method as set forth in claim 7 wherein producing the first $T_1$ and second $T_2$ time signals is further defined as timing the period for the first predetermined temperature to travel a first distance into the brake lining from a wear surface and timing the period for the second predetermined temperature to travel a second distance into the brake lining from the wear surface, said second distance being greater than said first distance.

9. A method as set forth in claim 8 further including the step of calculating the first distance according to the following formula $$X = \frac{(d_2)(T_1)}{(T_2)}$$

wherein $T_1$ is the first time signal, $T_2$ is the second time signal, $d_2$ is a known constant representing a distance between the first and second sensors that is less than $d_1$, and X is the first distance representing the remaining useful thickness of the brake lining on the backing plate.

10. A method as set forth in claim 9 further including the step of producing a warning signal when the first distance X is reduced to a first predetermined amount, indicating the brake lining has reached a first change level.

11. An apparatus for indicating the amount of brake lining material in a brake assembly comprising:
  a rotating drum to be braked and which is disposed about an axis of rotation;
  at least one brake shoe assembly having a brake lining supported by a backing plate and presenting a wear surface opposite from said drum;
  an actuator for actuating said wear surface against said drum;
  a first sensor at a first distance in said brake lining;
  a second sensor at a second distance in said brake lining;
  a timing device for producing a first time signal $T_1$ in response to timing the period for said first sensor to reach a first predetermined temperature and for producing a second time signal $T_2$ in response to timing the period for said second sensor to reach a second predetermined temperature;
  a processor for determining an amount of remaining brake lining material based on a comparison between the first $T_1$ and second $T_2$ time signals; and
  a display for showing the amount of remaining brake lining material.

12. An apparatus as set forth in claim 11 wherein the first sensor is spaced apart from the second sensor by a predetermined distance.

13. An apparatus as set forth in claim 11 wherein said first sensor is located at a first distance into said brake lining from its wear surface and said second sensor is located at a second distance into said brake lining from its wear surface, said second distance being greater than said first distance.

14. An apparatus as set forth in claim 13 wherein said processor calculates said first distance according to the following formula $$X = \frac{(d_1)(T_1^{3/4})}{((T_2 + T_1)^{3/4} - T_1^{3/4})}$$

wherein $T_1$ is the first time signal, $T_2$ is the second time signal, $d_1$ is a known constant representing the predetermined distance between the first and second sensors, and X is the first distance representing the remaining useful thickness of the brake lining on the backing plate.

15. An apparatus as set forth in claim 14 wherein said processor produces a warning signal for activating a warning device when said first distance is reduced to a first predetermined amount which indicates said brake assembly has reached a first change level.

16. An apparatus as set forth in claim 12 wherein the first sensor is spaced apart from the second sensor by an alternate distance, said alternate distance being less than said predetermined distance.

17. An apparatus as set forth in claim 16 wherein said first sensor is located at a first distance into said brake lining from its wear surface and said second sensor is located at a second distance into said brake lining from its wear surface, said second distance being greater than said first distance.

18. An apparatus as set forth in claim 13 wherein said processor calculates said first distance according to the following formula $$X = \frac{(T_1)(d)}{(T_2)}$$

wherein $T_1$ is the first time signal, $T_2$ is the second time signal, $d_2$ is a known constant representing the distance between the first and second sensors where $d_2$ is less than $d_1$, and X is the first distance representing the remaining useful thickness of the brake lining on the backing plate.

* * * * *